(12) United States Patent
Kaply et al.

(10) Patent No.: US 6,460,109 B1
(45) Date of Patent: Oct. 1, 2002

(54) INTEGRAL PORTABLE COMPUTER INPUT AND OUTPUT SWITCHING

(75) Inventors: Michael Aaron Kaply, Austin; Jeffrey Allen Jones, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,844

(22) Filed: Dec. 16, 1999

(51) Int. Cl.$^7$ ............................................... G06F 13/00
(52) U.S. Cl. ........................ 710/316; 710/305; 710/73
(58) Field of Search ............................... 710/1, 14, 31, 710/38, 72, 73, 100, 300, 303, 304, 305, 306, 313, 316; 709/238, 239

(56) References Cited

U.S. PATENT DOCUMENTS

| | | |
|---|---|---|
| 5,396,400 A | 3/1995 | Register et al. |
| 5,406,273 A | 4/1995 | Nishida et al. |
| 5,526,493 A | 6/1996 | Shu |
| 5,530,892 A | 6/1996 | Hwang |
| 5,933,609 A | 8/1999 | Walker et al. |
| 5,954,809 A | 9/1999 | Riley et al. |

*Primary Examiner*—Xuan M. Thai
(74) *Attorney, Agent, or Firm*—Joseph C. Redmond, Jr.; Morgan & Finnegan, LLP

(57) ABSTRACT

An apparatus which allows a user to use any desired combination of keyboard, input device, and display to operate and control either of two computer systems. The switching apparatus is in a computer system comprising a display adapter operable to output a display signal, an input adapter operable to receive a keyboard signal and a pointing device signal, a display device operable to receive a display signal, a keyboard operable to output a keyboard signal, and a pointing device operable to output a pointing device signal. The switching apparatus comprises a display switching circuit connected to the display signal and connectable to an external display signal, operable to select between the display signal and the external display signal and output the selected signal to the display device or to an external display device; a keyboard switching circuit connected to the keyboard signal and connectable to an external keyboard signal, operable to select between the keyboard signal and the external keyboard signal and output the selected signal to the input adapter or to an external computer system; and a pointing device switching circuit connected to the pointing device signal and connectable to an external pointing device signal, operable to select between the pointing device signal and the pointing device keyboard signal and output the selected signal to the input adapter or to an external computer system.

31 Claims, 12 Drawing Sheets

INTEGRAL PORTABLE COMPUTER INPUT AND OUTPUT SWITCHING

FIELD OF THE INVENTION

The present invention relates to integral apparatus for switching input and output signals between a portable computer system and an external computer system.

BACKGROUND OF THE INVENTION

Users of laptop computers often have one or more other computer systems with which they work. A common configuration involves a user having a computer at work another computer at home, and a laptop computer with which to shuttle data between, and perhaps to do work in transit. In order to fully utilize this configuration, the laptop computer and the additional computer systems, which are typically desktop computers, must have their data synchronized among them.

Two usability problems arise from this common configuration. First, users typically prefer to use one set of input devices over the other. For example, a user may prefer to use the keyboard and pointing device, such as a mouse, trackball, etc, of a desktop computer, rather than the keyboard and pointing device of the laptop computer. However, in this configuration, the user must alternate between using the preferred input devices and the non-preferred input devices.

A second problem arises when a user must use both the laptop computer and a desktop computer at the same time, such as when synchronizing data between the two computers. In this situation, the user must alternate between using the user interface devices, such as keyboard, input device, and display, of the two computers.

A need arises for a technique which allows a user to use any desired combination of keyboard, input device, and display to operate and control either of two computer systems.

SUMMARY OF THE INVENTION

The present invention is an apparatus which allows a user to use any desired combination of keyboard, input device, and display to operate and control either of two computer systems. In one embodiment the present invention is a switching apparatus in a computer system comprising a display adapter operable to output a display signal, an input adapter operable to receive a keyboard signal and a pointing device signal a display device operable to receive a display signal, a keyboard operable to output a keyboard signal, and a pointing device operable to output a pointing device signal. The switching apparatus comprises a display switching circuit connected to the display signal and connectable to an external display signal, operable to select between the display signal and the external display signal and output the selected signal to the display device or to an external display device; a keyboard switching circuit connected to the keyboard signal and connectable to an external keyboard signal, operable to select between the keyboard signal and the external keyboard signal and output the selected signal to the input adapter or to an external computer system; and a pointing device switching circuit connected to the pointing device signal and connectable to an external pointing device signal, operable to select between the pointing device signal and the pointing device keyboard signal and output the selected signal to the input adapter or to an external computer system.

The computer system may further comprise a central processing unit and the display switching circuit, the keyboard switching circuit, and the pointing device switching circuit may be controllable by the central processing unit.

In another embodiment, the present invention is a circuit in a computer system comprising a central processing unit a display device operable to receive a display signal, a keyboard operable to output a keyboard signal, and a pointing device operable to output a pointing device signal. The circuit comprises a display circuit connected to the display device and connectable to an external display device, operable to receive an external display signal, operable to generate a display signal to drive the display device and to generate a display signal to drive the external display device, operable to selectively output the generated display signal to the display device, the external display device or both the display device and the external display device, and operable to selectively output the external display signal to the display device, the external display device or both the display device and the external display device; a keyboard circuit connected to the keyboard and connectable to an external keyboard, operable to receive an external keyboard signal, operable to selectively output the keyboard signal to the central processing unit an external computer system, or both the central processing unit and an external computer system, and operable to selectively output the external keyboard signal to the central processing unit, an external computer system, or both the central processing unit and an external computer system; and a pointing device circuit connected to the pointing device and connectable to an external pointing device, operable to receive an external pointing device signal, operable to selectively output the pointing device signal to the central processing unit, an external computer system, or both the central processing unit and an external computer system, and operable to selectively output the external pointing device signal to the central processing unit, an external computer system, or both the central processing unit and an external computer system.

The display circuit, the keyboard circuit, and the pointing device circuit may be controllable by the central processing unit. The circuit may further comprise a memory operable to store information relating to a configuration, a setting, or a current state of the display circuit, the keyboard circuit, or the pointing device circuit, and operable to store information relating to the internal display, the external display, the internal pointing device, external pointing device, the internal keyboard, or the external keyboard.

The display circuit may be configured so as to output the generated display signal to the display device and the external display signal to the external display device, the keyboard circuit may be configured to output the keyboard signal to the central processing unit and the external keyboard signal to the external computer system, and the pointing device circuit may be configured to output the pointing device signal to the central processing unit and the external pointing device signal to the external computer system.

Alternatively, at least one of the following configurations may be selected: the display circuit may be configured so as to output the generated display signal to the external display device and the external display signal to the display device, the keyboard circuit may be configured to output the keyboard signal to the external computer system and the external keyboard signal to the central processing unit, and the pointing device circuit may be configured to output the pointing device signal to the external computer system and the external pointing device signal to the central processing unit.

Alternatively, at least one of the following configurations may be selected: the display circuit may be configured so as to output the generated display signal to the external display device and to the display device, the keyboard circuit may be configured to output the keyboard signal to the external computer system and to the central processing unit, and the pointing device circuit may be configured to output the pointing device signal to the external computer system and to the central processing unit.

Alternatively, at least one of the following configurations may be selected: the display circuit may be configured so as to output the external display signal to the external display device and to the display device, the keyboard circuit may be configured to output the external keyboard signal to the external computer system and to the central processing unit, and the pointing device circuit may be configured to output the external pointing device signal to the external computer system and to the central processing unit.

Alternatively, at least one of the following configurations may be selected: the display circuit may be configured so as to output the external display signal and the generated display signal to the display device, the keyboard circuit may be configured to output the external keyboard signal and the keyboard signal to the central processing unit, and the pointing device circuit may be configured to output the external pointing device signal and the pointing device signal to the central processing unit.

Alternatively, at least one of the following configurations may be selected: the display circuit may be configured so as to output the external display signal and the generated display signal to the external display device, the keyboard circuit may be configured to output the external keyboard signal and the keyboard signal to the external computer system, and the pointing device circuit may be configured to output the external pointing device signal and the pointing device signal to the external computer system.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 1:
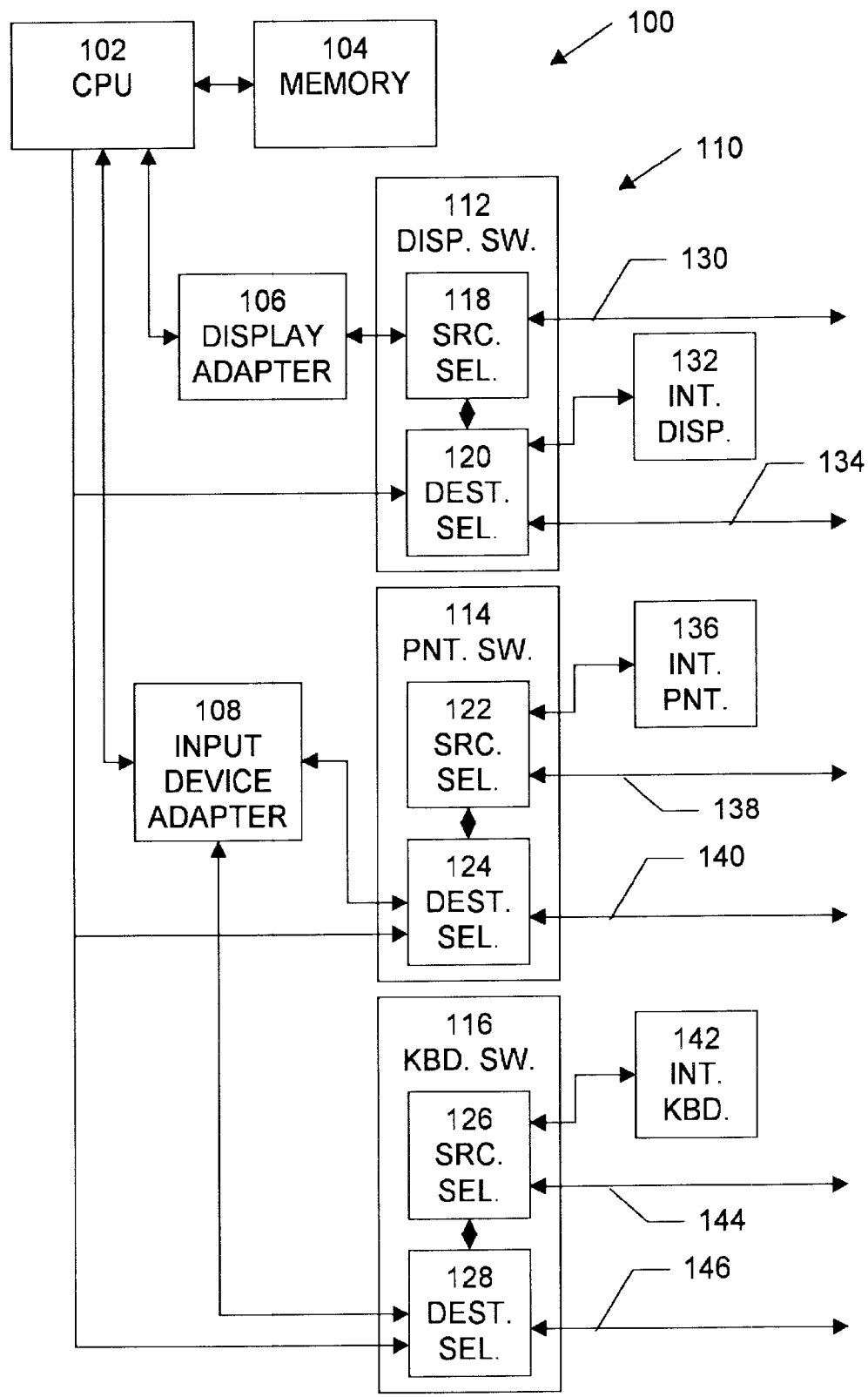
FIG. 1 is an exemplary block diagram of one embodiment of a portable computer system, according to the present invention.

An exemplary portable computer system 100, according to the present invention, is shown in FIG. 1. System 100 includes central processing unit (CPU) 102, memory 104, display adapter 106, input device adapter 108, and switching circuitry 110. CPU 102 typically includes a microprocessor, for example, an INTEL PENTIUM processor, but may include a higher performance processor, such as is found in a mini-computer or mainframe computer, or in a multi-processor system. Memory 104 may include random access memory (RAM), read-only memory (ROM), floppy disk drives, hard disk drives, tape drives, compact disk drives, etc. Display adapter 106 is circuitry that generates signals necessary to drive a display device, such as a monitor or liquid crystal display. Input device adapter 108 is circuitry that communicates with input devices, such as a keyboard, and pointing devices, such as a mouse, trackpoint trackball, trackpad, etc.

Switching circuitry 110 includes display switch 112, pointing device switch 114 and keyboard switch 116. Display switch 112 includes source selector 118 and destination selector 120. Pointing device switch 114 includes source selector 122 and destination selector 124. Keyboard switch 116 includes source selector 126 and destination selector 128. Circuit 110 connects and switches a plurality of inputs and outputs, as shown in FIG. 1. FIG. 1 depicts most connections as bi-directional, as this is typically the case. For example, display switch 112 may output a display signal to a display device and this is the predominant function of the connection. However, the display device may also transmit signals, such as signals indicating mode, resolution, etc., to the computer system over the same connector. Likewise, the keyboard and pointing device, which predominantly provide signals which are input to the computer system, may also receive signals from the computer system, which allow configuration and initialization of the devices. In the following description of FIG. 1, connections are named based on the predominant function of the connection. However, it must be remembered that any or all such connections may be bi-directional.

Source selector 118 of display switch 112 is connected to the output of display adapter 106 and to display input connector 130. Destination selector 120 of display switch 112 is connected to the input of internal display 132 and display output connector 134. Source selector 118 selects a display source signal from between the output of display adapter 106 and a display signal input on display input connector 130. The selected display source signal is input to destination selector 120, which outputs the display signal to internal display 132 or to display output connector 134. The alternate-directional signals are also switched appropriately.

Source selector 122 of pointing device switch 114 is connected to the output of internal pointing device 136 and to pointing device input connector 138. Destination selector 124 of pointing device switch 114 is connected to the input to input adapter 108 and pointing device output connector 140. Source selector 122 selects a pointing device source signal from between the output of internal pointing device 136 and a pointing device signal input on pointing device input connector 138. The selected pointing device source signal is input to destination selector 124, which outputs the pointing device signal to input adapter 108 or to pointing device output connector 140. The alternate-directional signals are also switched appropriately.

Source selector 126 of keyboard switch 116 is connected to the output of internal keyboard 142 and to keyboard input connector 144. Destination selector 128 of keyboard switch 116 is connected to the input to input adapter 108 and keyboard output connector 146. Source selector 126 selects a keyboard source signal from between the output of internal keyboard 142 and a keyboard signal input on keyboard input connector 144. The selected keyboard source signal is input to destination selector 128, which outputs the keyboard signal to input adapter 108 or to keyboard output connector 144. The alternate-directional signals are also switched appropriately.

Display switch 112, pointing device switch 114 and keyboard switch 116 are controlled by CPU 102 to switch the source selectors and destination selectors as appropriate.

Figure 2:
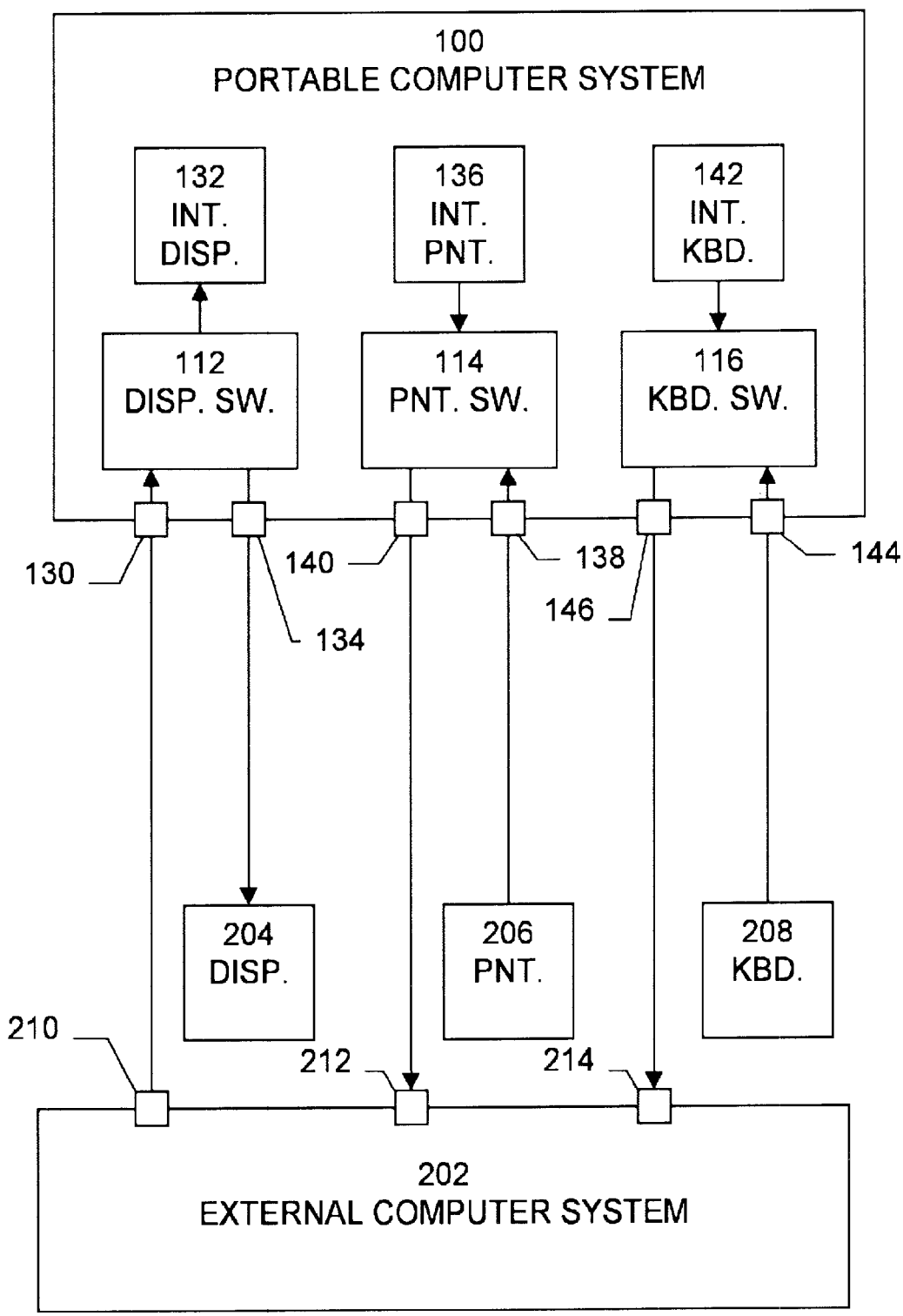
FIG. 2 is an exemplary block diagram of a system in which the portable computer system of FIG. 1 may be used.

A system in which portable computer system 100 may be used is shown in FIG. 2. System 100 is interconnected to an external computer system 202, an external display 204, an external pointing device 206, and an external keyboard 208. External computer system 202 is typically a desktop computer system. External display 204 is typically a monitor that is normally used with computer system 202. Pointing device 206 is typically a mouse, trackball, trackpad, etc. that is normally used with computer system 202. Keyboard 208 is typically normally used with computer system 202.

Display output 210 of external computer system 202 is connected to display input 130 of portable computer system 100. External display 204 is connected to display output 134. Pointing device input 212 of external computer system 202 is connected to pointing device output 140 of portable computer system 100. External pointing device 206 is connected to pointing device input 138 of portable computer system 100. Keyboard input 214 of external computer system 202 is connected to keyboard output 144 of portable computer system 100. External keyboard 208 is connected to keyboard input 144 of portable computer 100.

By appropriate selection of source and output switches, portable computer system 100 may be configured to utilize, or to cause external computer system 202 to utilize, and to switch among, any arrangement of internal and external devices. A variety of such configurations will be described with reference to FIGS. 1 and 2. For example, display switch 112 may be configured to route video from external computer system 202 to internal display 132 or to external display 204, or to route video from portable computer system 100 to internal display 132 or to external display 204. Pointing device switch 114 may be configured to route pointing device signals from external pointing device 206 to portable computer system 100 or to external computer system 202, or to route pointing device signals from internal pointing device 136 to portable computer system 100 or to external computer system 202. Likewise, keyboard switch 116 may be configured to route keyboard signals from external keyboard 208 to portable computer system 100 or to external computer system 202, or to route keyboard signals from internal keyboard 142 to portable computer system 100 or to external computer system 202. The alternate-directional signals are also routed appropriately.

Figure 3:
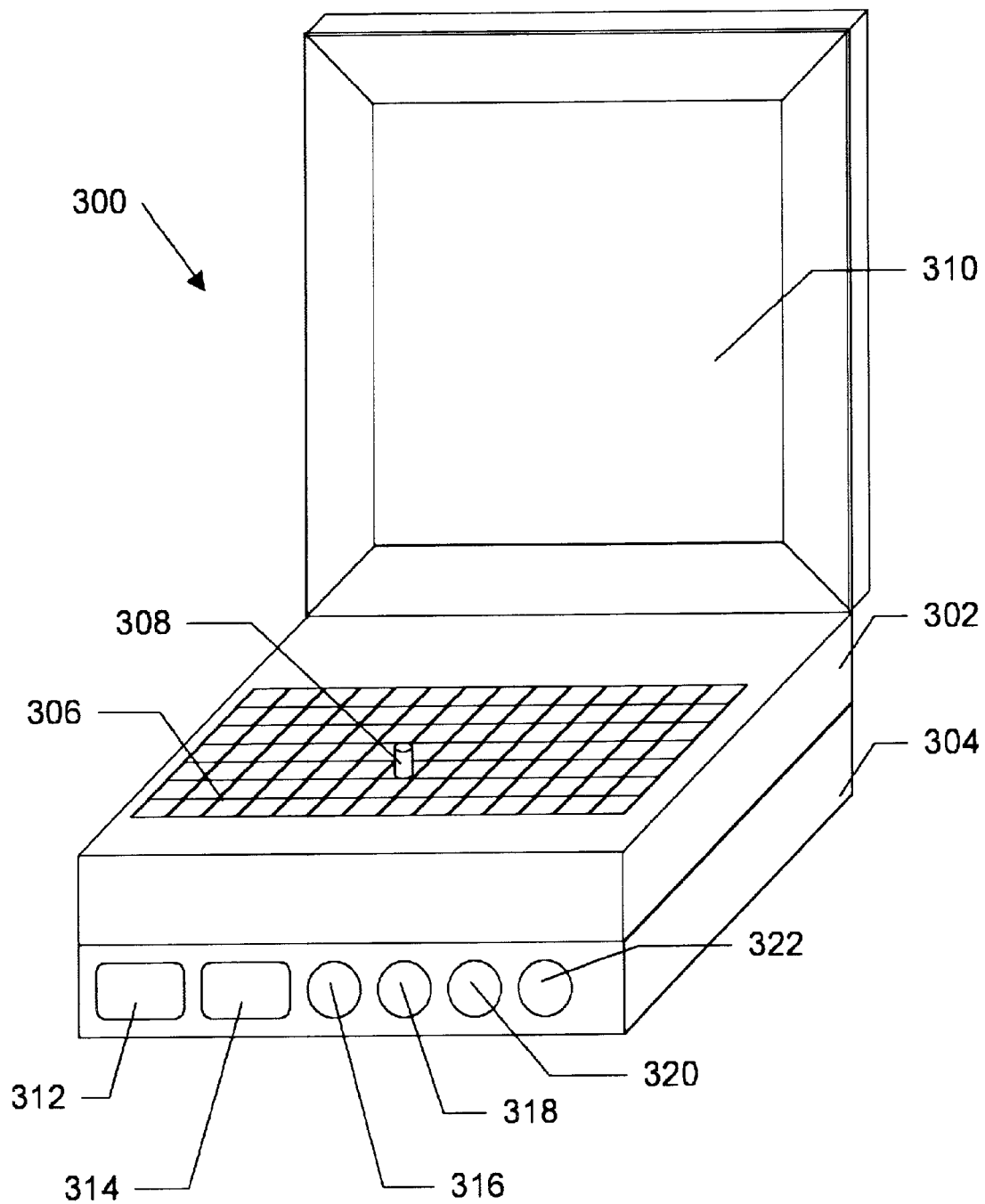
FIG. 3 is a depiction of a physical implementation of the portable computer system of FIG. 1.

A physical implementation of an exemplary portable computer system 300, according to the present invention, is shown in FIG. 3. System 300 includes portable computer 302 and docking station 304. Portable computer 302 includes input devices, such as keyboard 306 and trackpoint 308, and output devices, such as display 310. Docking station 304 includes a plurality of connectors, such as video connectors 312 and 314, keyboard connectors 316 and 318, and input device connectors 320 and 322. The video connectors include video input connector 312 and video output connector 314. The keyboard connectors include keyboard input connector 316 and keyboard output connector 318. The input device connectors include input device input connector 320 and input device output connector 322.

Although, in FIG. 1, portable computer 302 is shown attached to docking station 304 and connectors 312–322 are shown on docking station 304, one of skill in the art would recognize that other configurations are possible. For example, connectors 312–322 may be included in portable computer 302 and docking station 304 may not be used. Such variations in configuration are dependent upon implementation factors such as cost size of the devices, etc. The present invention contemplates any and all such configurations.

Figure 4:
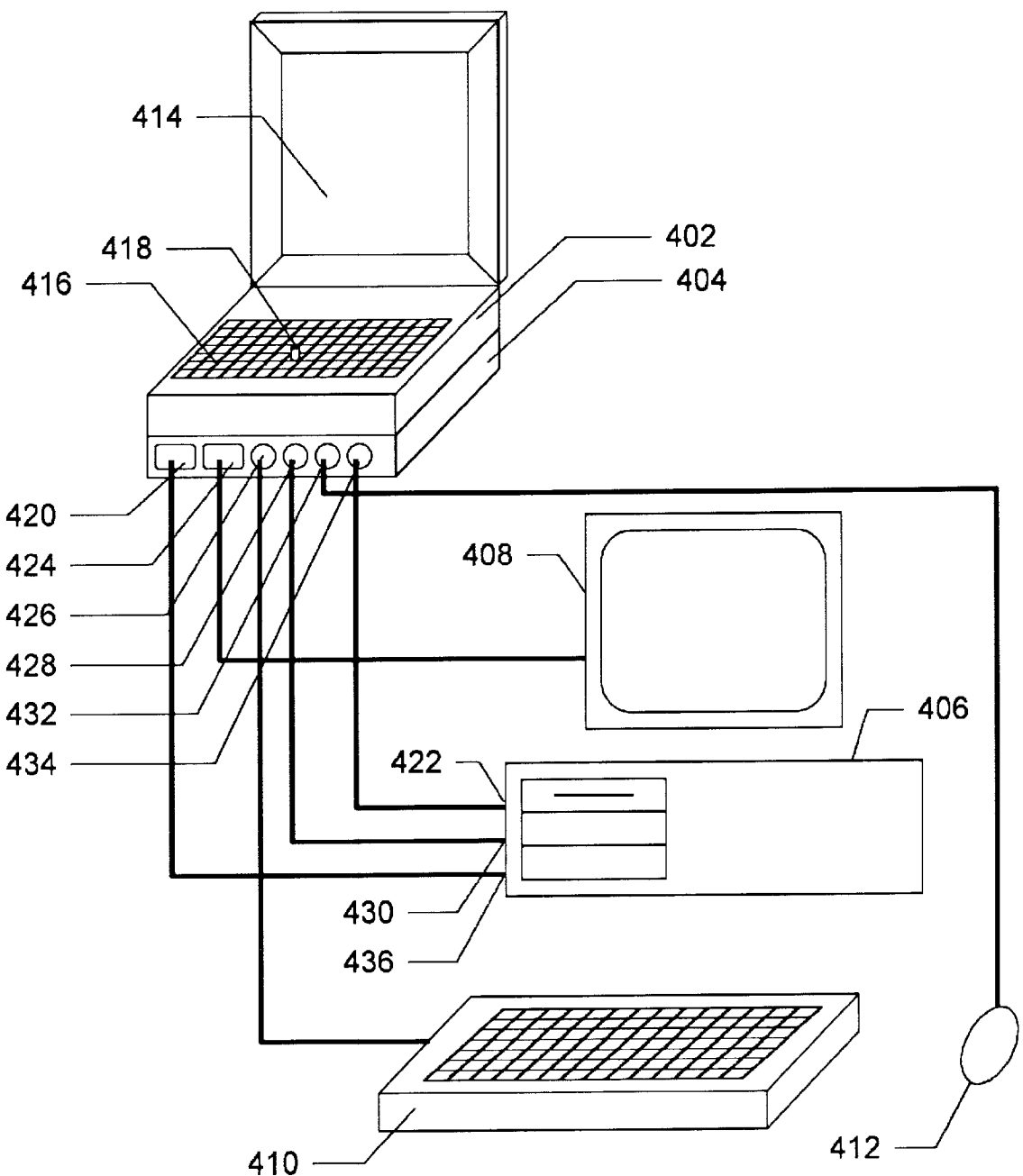
FIG. 4 is a depiction of a physical implementation of the system of FIG. 2.

A typical implementation of the present invention in use is shown in FIG. 4. Portable computer system 402 and docking station 404 are interconnected with external computer system 406, external display 408, external keyboard 410, and external pointing device 412. Portable computer system 402 includes internal display 414, internal keyboard 416, and internal pointing device 418. Display input 420 is connected to display output 422 of external computer system 406 and display output 424 is connected to external display 408. Keyboard input 426 is connected to external keyboard 410 and keyboard output 428 is connected to keyboard input 430 of external computer system 406. Pointing device input 432 is connected to external pointing device 412 and pointing device output 434 is connected to pointing device input 436 of external computer system 436.

In one embodiment a user who prefers the display, keyboard, and pointing device of portable computer system 402 may configure the present invention so that he may use display 414, keyboard 416, and pointing device 418 to operate and control external computer system 406. In this embodiment, display switch 112 of FIG. 1 is configured to select as source the display signal from external computer system 406 and to output the display signal to internal display 414. Of course, the display signal from external computer system 406 must be compatible, or be configured to be compatible, with the signal required to drive internal display 414. Keyboard switch 116 of FIG. 1 is configured to select as source the keyboard signal from internal keyboard 416 and to output the keyboard signal to external computer system 406. Pointing device switch 114 of FIG. 1 is configured to select as source the pointing device signal from internal pointing device 418 and to output the pointing device signal to external computer system 406.

In another embodiment a user who prefers the display, keyboard, and pointing device of external computer system 406 may configure the present invention so that he may use external display 408, external keyboard 410 and external pointing device 412 to operate and control portable computer system 402. In this embodiment display switch 112 of FIG. 1 is configured to select as source the display signal from portable computer system 402 and to output the display signal to external display 408. Of course, the display signal from portable computer system 402 must be compatible, or be configured to be compatible, with the signal required to drive external display 408. Keyboard switch 116 of FIG. 1 is configured to select as source the keyboard signal from external keyboard 410 and to output the keyboard signal to portable computer system 402. Pointing device switch 114 of FIG. 1 is configured to select as source the pointing device signal from external pointing device 412 and to output the pointing device signal to portable computer system 402.

Other embodiments are also possible. For example, the present invention may be configured to allow use of external pointing device 412 with internal keyboard 416 and internal display 414. The present invention may be configured to allow use of external pointing device 412 and external keyboard 410 with internal display 414. The present invention may be configured to allow use of internal keyboard 416 and internal pointing device 418 with external display 408, etc.

In addition, the present invention may be configured so that whatever the combination of display, keyboard, and pointing device that are in use, the use may alternately operate and control either computer system. For example, the user may be using external display 408, external keyboard 410, and external pointing device 412, and may control and operate either portable computer system 402 or external computer system 406. Likewise, the user may alternately switch between controlling each computer system.

In a preferred embodiment, software running on portable computer system 402 is used to control switching circuitry 110 of FIG. 1. The user may command the software to configure the system as desired, and may command the software to switch between computer systems as desired. Other embodiments are also possible. For example, a special purpose logic circuit, in which the functions necessary to carry out the present invention have been implemented in logic, could be used instead. This logic circuit could be implemented using application-specific integrated circuits (ASIC), such as a custom integrated circuits (IC), semi-custom ICs, or gate-arrays, etc., programmable devices, such as field-programmable gate-arrays or programmable logic devices, etc., standard integrated circuits, or discrete components.

In the configuration in which the external computer system is being operated, the portable computer system may not seem to be configured to receive commands from the keyboard or pointing device. In this situation, a command signal must be made available to control switching and configuration. In one embodiment, a special purpose switch or a programmed switch may be provided on the portable computer system or docking station. In another embodiment, the signal from the external keyboard or external pointing device may be monitored by the portable computer system so that switching circuitry 110 may be switched as commanded.

Figure 5:
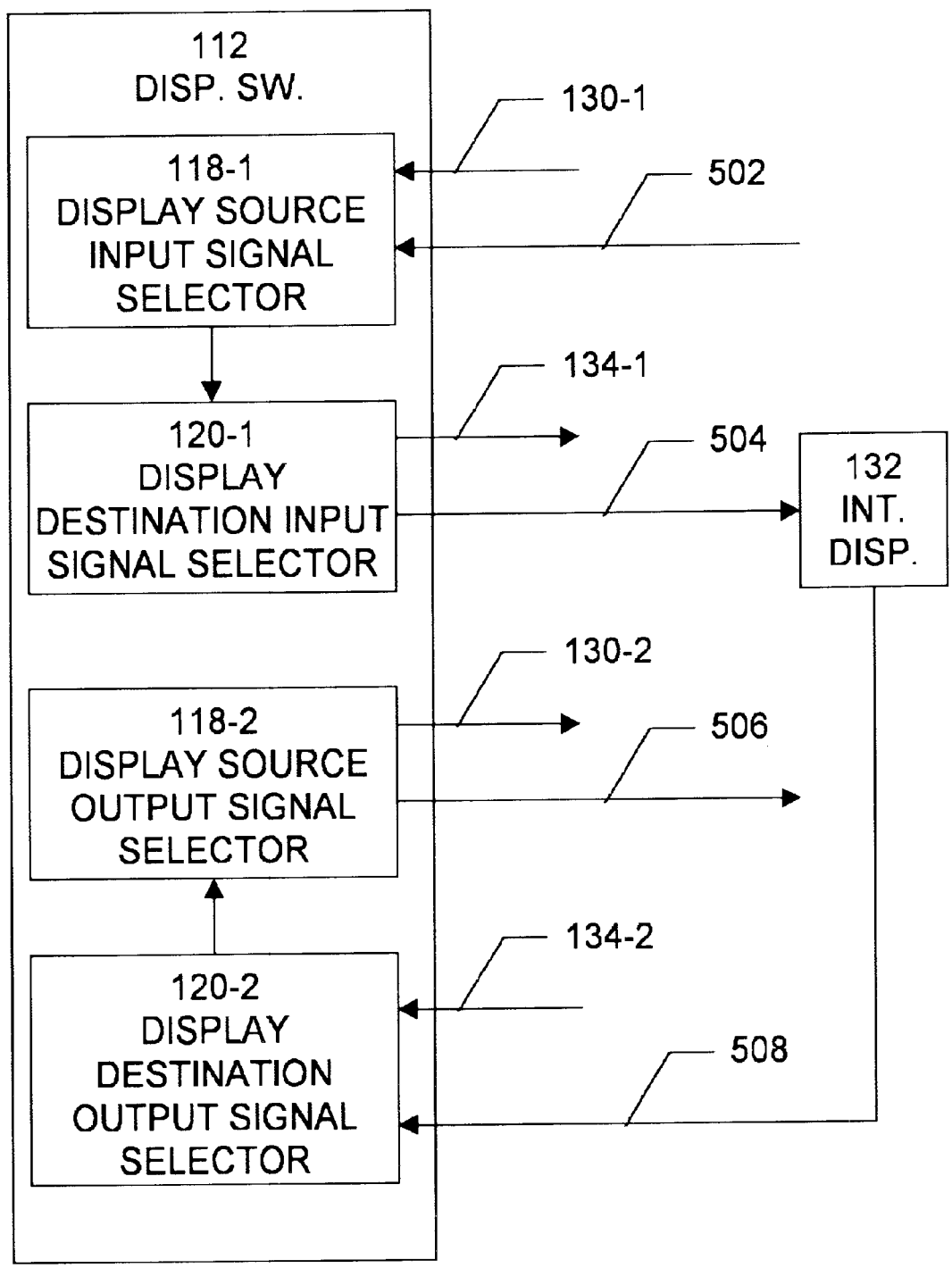
FIG. 5 is an exemplary block diagram of a display switch shown in FIG. 1.

Display switch 112 of FIG. 1 is shown in more detail in FIG. 5. In FIG. 5, the switching of input and output signals is explicitly shown. Display switch 112 includes display source input signal selector 118-1, display source output signal selector 118-2, display destination input signal selector 120-1, and display destination output signal selector 120-2. Together, display source input signal selector 118-1 and display source output signal selector 118-2 make up display source selector 118, shown in FIG. 1, and display source output signal selector 120-1 and display destination output signal selector 120-2 make up display destination selector 120, shown in FIG. 1.

Display source input signal selector 118-1 is connected to external display input signal 130-1 and display adapter input signal 502. External display input signal 130-1 is input from an external computer system on external display input connector 130, shown in FIG. 1. Display adapter input signal 502 is output by display adapter 106, shown in FIG. 1. Display source input signal selector 118-1 selects the appropriate source signal and outputs it to display destination input signal selector 120-1. Display destination input signal selector 120-1 is connected to external display output signal 134-1 and to internal display output signal 504. External display output signal 134-1 is input to an external display on external display output connector 134. Internal display output signal 504 is output to internal display 132.

Display source output signal selector 118-2 is connected to external display output signal 130-2 and display adapter output signal 506. External display output signal 130-2 is output to an external computer system on external display input connector 130, shown in FIG. 1. Display adapter output signal 506 is output to display adapter 106, shown in FIG. 1. Display source output signal selector 118-2 receives a signal from display destination output signal selector 120-2 and outputs it to the appropriate display source device. Display destination output signal selector 120-2 is connected to external display input signal 134-2 and to internal display input signal 508. External display input signal 134-2 is input from an external display on external display output connector 134. Internal display input signal 504 is input from internal display 132.

Figure 6:
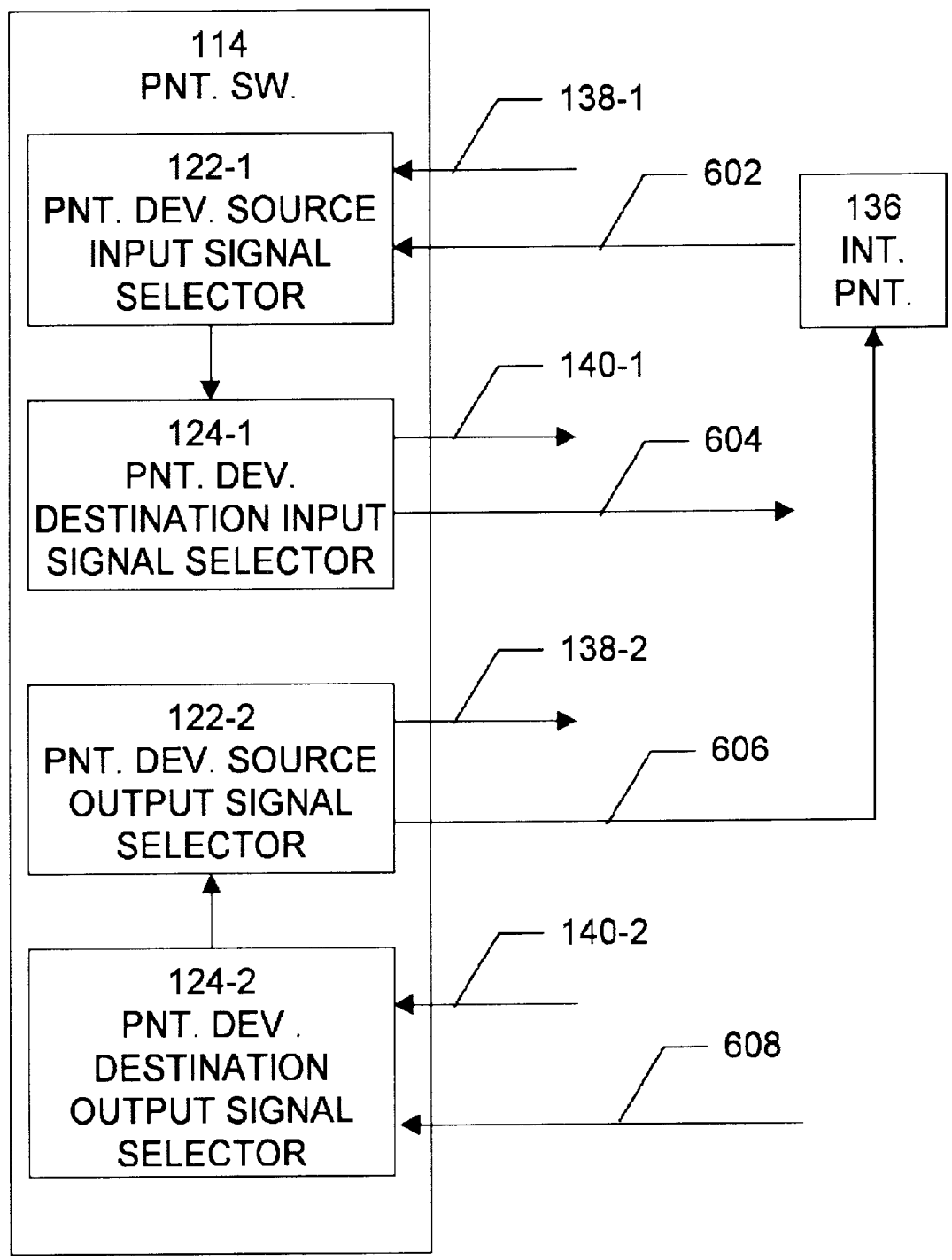
FIG. 6 is an exemplary block diagram of a pointing device switch shown in FIG. 1.

Pointing device switch 114 of FIG. 1 is shown in more detail in FIG. 6. In FIG. 6, the switching of input and output signals is explicitly shown. Pointing device switch 114 includes pointing device source input signal selector 122-1, pointing device source output signal selector 122-2, pointing device destination input signal selector 124-1, and pointing device destination output signal selector 124-2. Together, pointing device source input signal selector 122-1 and pointing device source output signal selector 122-2 make up pointing device source selector 122, shown in FIG. 1, and pointing device source output signal selector 124-1 and pointing device destination output signal selector 124-2 make up pointing device destination selector 124, shown in FIG. 1.

Pointing device source input signal selector 122-1 is connected to external pointing device input signal 138-1 and internal pointing device input signal 602. External pointing device input signal 138-1 is input from an external pointing system on external pointing device input connector 138, shown in FIG. 1. Internal pointing device input signal 602 is output from internal pointing device 136, shown in FIG. 1. Pointing device source input signal selector 122-1 selects the appropriate source signal and outputs it to pointing device destination input signal selector 124-1. Pointing device destination input signal selector 124-1 is connected to external pointing device output signal 140-1 and to internal pointing device output signal 604. External pointing device output signal 140-1 is output to an external computer system on external pointing device output connector 140. Internal pointing device output signal 604 is output to input adapter 108, shown in FIG. 1.

Pointing device source output signal selector 122-2 is connected to external pointing device output signal 138-2 and internal pointing device output signal 606. External pointing device output signal 138-2 is output to an external pointing device on external pointing device input connector 138, shown in FIG. 1. Pointing device adapter output signal 606 is output to pointing device 136, shown in FIG. 1. Pointing device source output signal selector 122-2 receives a signal from pointing device destination output signal selector 124-2 and outputs it to the appropriate pointing device source device. Pointing device destination output signal selector 124-2 is connected to external pointing device input signal 140-2 and to internal pointing device input signal 608. External pointing device input signal 140-2 is input from an external computer system on external pointing device output connector 140. Internal pointing device input signal 608 is input from input adapter 108.

Figure 7:
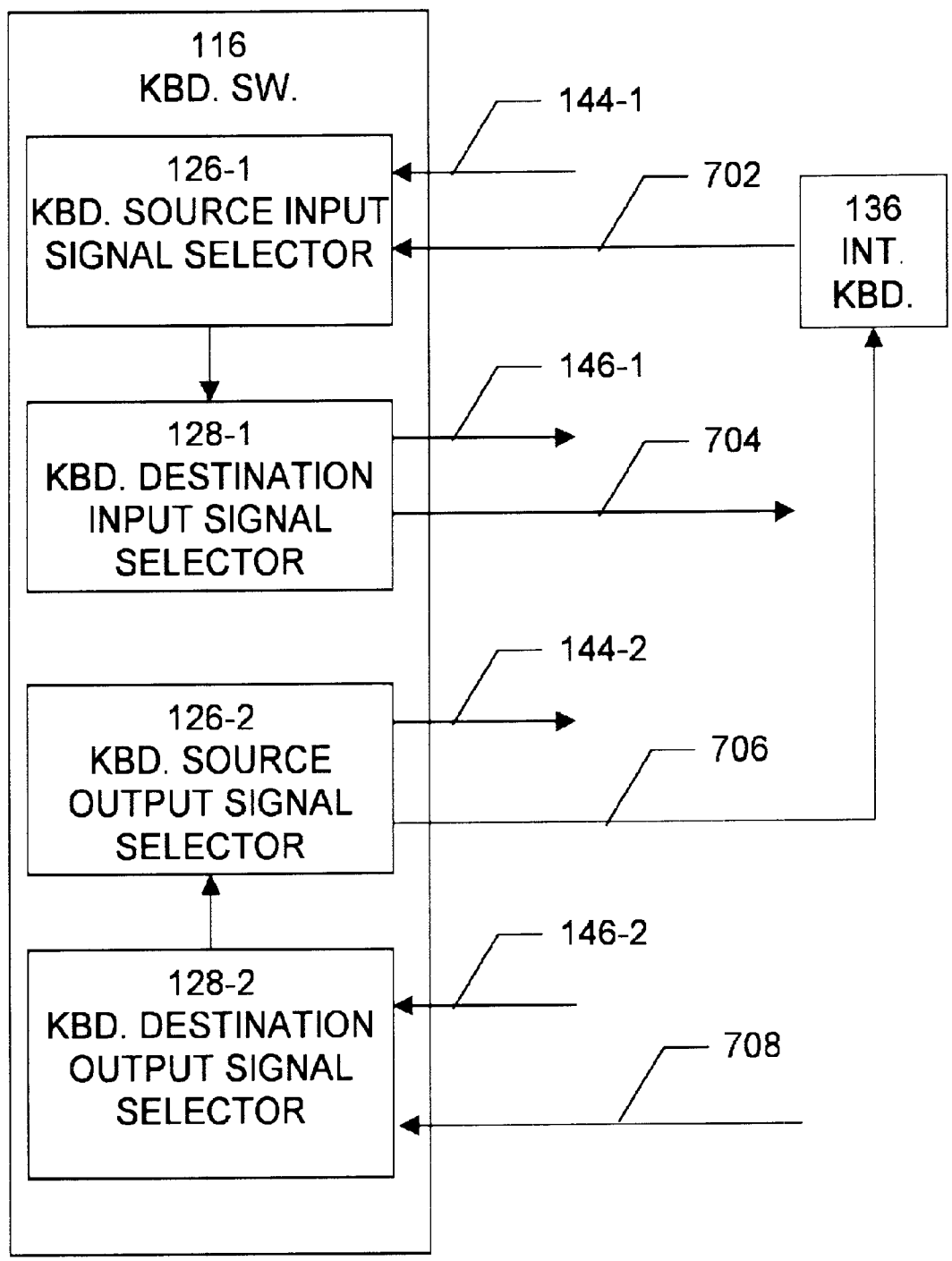
FIG. 7 is an exemplary block diagram of a keyboard switch shown in FIG. 1.

Keyboard switch 116 of FIG. 1 is shown in more detail in FIG. 7. In FIG. 7, the switching of input and output signals is explicitly shown. Keyboard switch 116 includes keyboard source input signal selector 126-1, keyboard source output signal selector 126-2, keyboard destination input signal selector 128-1, and keyboard destination output signal selector 128-2. Together, keyboard source input signal selector 126-1 and keyboard source output signal selector 126-2 make up keyboard source selector 126, shown in FIG. 1, and keyboard source output signal selector 128-1 and keyboard destination output signal selector 128-2 make up keyboard destination selector 128, shown in FIG. 1.

Keyboard source input signal selector 126-1 is connected to external keyboard input signal 144-1 and internal keyboard input signal 702. External keyboard input signal 144-1 is input from an external pointing system on external keyboard input connector 144, shown in FIG. 1. Internal keyboard input signal 702 is output from internal keyboard 142, shown in FIG. 1. Keyboard source input signal selector 126-1 selects the appropriate source signal and outputs it to keyboard destination input signal selector 128-1. Keyboard destination input signal selector 128-1 is connected to external keyboard output signal 146-1 and to internal keyboard output signal 704. External keyboard output signal 146-1 is output to an external computer system on external keyboard output connector 146. Internal keyboard output signal 704 is output to input adapter 108, shown in FIG. 1.

Keyboard source output signal selector 126-2 is connected to external keyboard output signal 144-2 and internal keyboard output signal 706. External keyboard output signal 144-2 is output to an external keyboard on external keyboard input connector 144, shown in FIG. 1. Keyboard adapter output signal 706 is output to keyboard 142, shown in FIG. 1. Keyboard source output signal selector 126-2 receives a signal from keyboard destination output signal selector 128-2 and outputs it to the appropriate keyboard source device. Keyboard destination output signal selector 128-2 is connected to external keyboard input signal 146-2 and to internal keyboard input signal 708. External keyboard input signal 146-2 is input from an external computer system on external keyboard output connector 146. Internal keyboard input signal 708 is input from input adapter 108.

Figure 8:
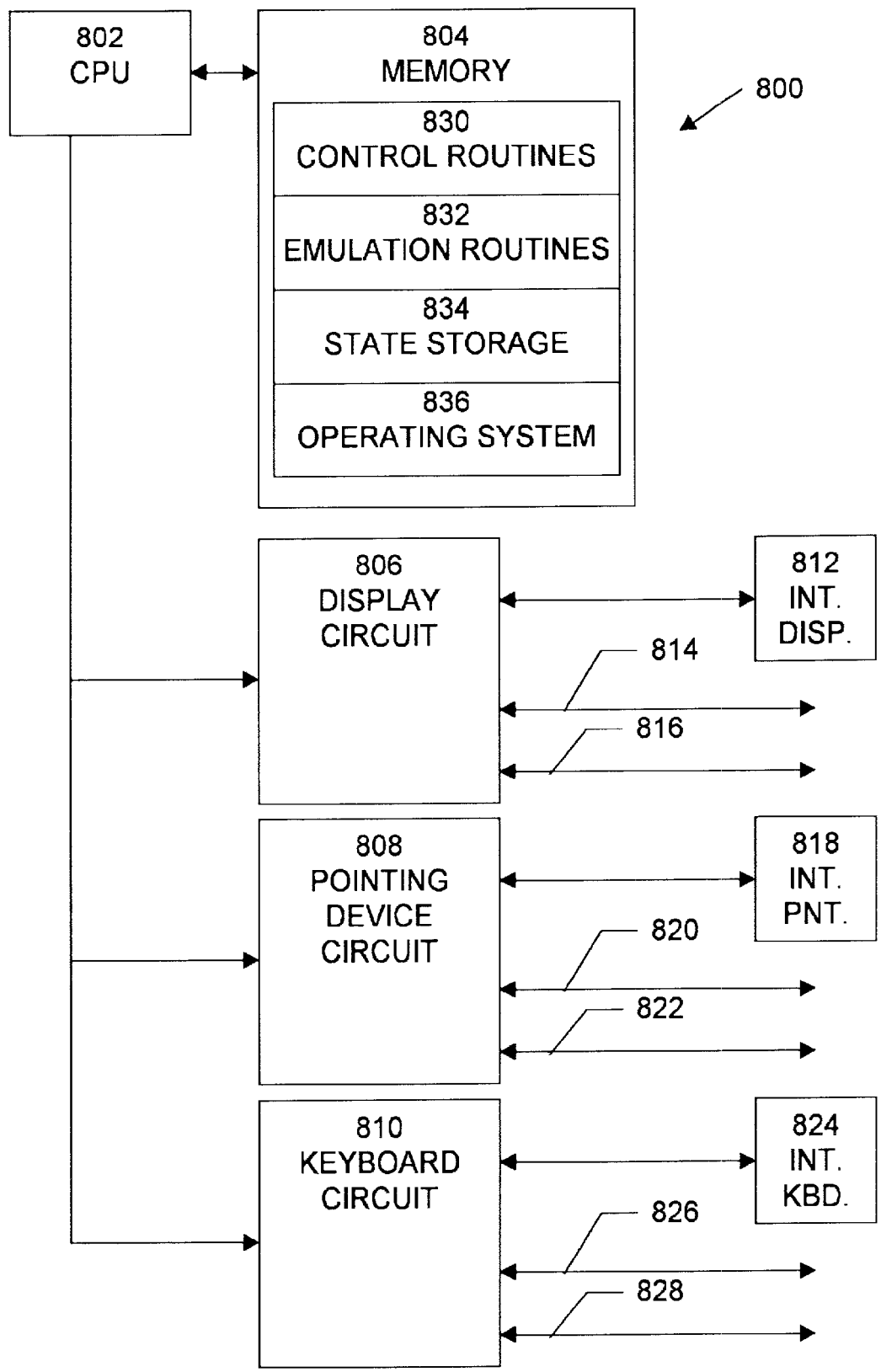
FIG. 8 is an exemplary block diagram of another embodiment of a portable computer system, according to the present invention.

Another embodiment of the present invention, a portable computer system 800, is shown in FIG. 8. System 800 includes central processing unit (CPU) 802, memory 804, display circuit 806, pointing device circuit 808, and keyboard circuit 810. CPU 802 typically includes a microprocessor, for example, an INTEL PENTIUM processor, but may include a higher performance processor, such as is found in a mini-computer or mainframe computer, or in a multi-processor system. Memory 804 may include random access memory (RAM), read-only memory (ROM), floppy disk drives, hard disk drives, tape drives, compact disk drives, etc.

Display circuit 806 is connected to internal display 812, external display connector 814 and external computer system connector 816. Display circuit 806 includes circuitry that can generate display signals capable of driving a variety of display devices, such as cathode ray tube monitors and liquid crystal display screens. Display circuit 806 includes circuitry that can emulate a variety of devices to which external display devices may be connected. Display circuit 806 also includes circuitry which can connect and/or switch the input and output display signals as appropriate to implement the desired display configuration.

Pointing device circuit 808 is connected to internal pointing device 818, external pointing device connector 820 and external computer system connector 822. Pointing device circuit 808 includes circuitry that can emulate a variety of devices to which the internal and external pointing devices may be connected, including circuitry that can generate signals to communicate with a variety of such pointing devices. Pointing device circuit 808 also includes circuitry which can connect and/or switch the input and output pointing device signals as appropriate to implement the desired pointing device configuration.

Keyboard circuit 810 is connected to internal keyboard 824, external keyboard connector 826 and external computer system connector 828. Keyboard circuit 810 includes circuitry that can emulate a variety of devices to which the internal and external keyboards may be connected, including circuitry that can generate signals to communicate with a variety of such keyboards. Keyboard circuit 810 also includes circuitry which can connect and/or switch the input and output keyboard signals as appropriate to implement the desired keyboard configuration.

Memory 804 includes program instructions and data which are used by CPU 802 to control circuits 806–810. For example, memory 804 includes control routines 830, emulation routines 832, state storage 834, and operating system 836. Control routines 830 control the configuration and settings of circuits 806–810 in order to implement the desired display, pointing device, and keyboard configurations. Emulation routines 832 allow system 800 to em emulate the variety of devices to which the internal and external displays, pointing devices, and keyboards may be connected. State storage 834 stores data specifying the configurations, settings, and current state of circuits 806–810 and the internal and external displays, pointing devices, and keyboards for the various configurations desired. Operating system 836 provides overall system functionality.

The embodiment of the present invention shown in FIG. 8 may implement a variety of configurations. For example, the portable computer system and the desktop computer system may be cross-switched as desired: any display, pointing device, and keyboard may be connected to either the portable computer system or the desktop computer system as desired. In addition, system 800 may be configured so that both internal and external devices actively communicate with either the portable computer system or the desktop computer system. For example, system 800 may be configured so that both internal display 812 and the external display are displaying the same information. Likewise, system 800 may be configured so that both internal and external keyboards and/or pointing devices input into one computer system, either the portable computer system or the desktop computer system.

Figure 9:
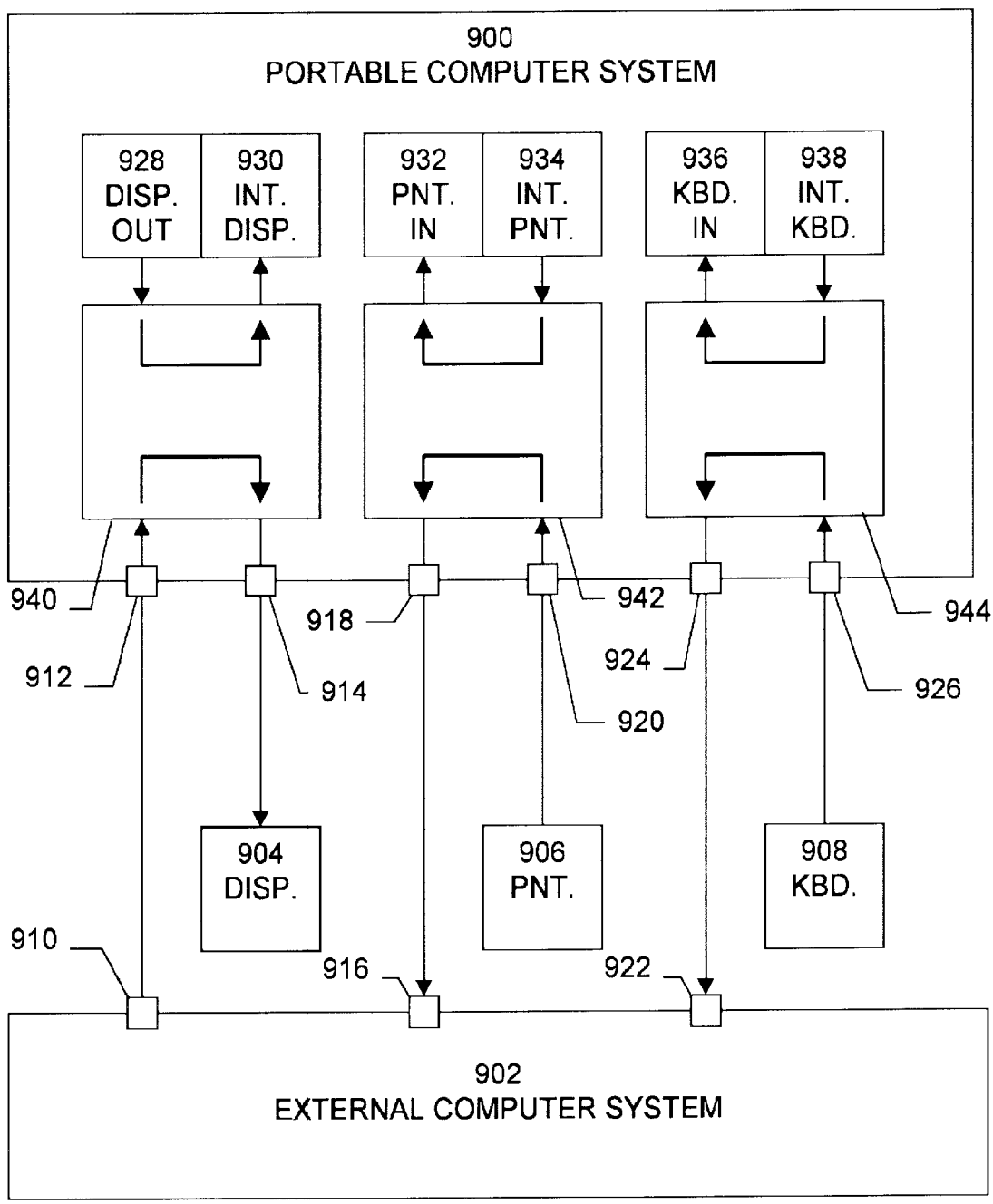
FIG. 9 is an exemplary block diagram of one configuration of a system in which the portable computer system of FIG. 8 may be used.

An exemplary configuration of the present invention is shown in FIG. 9. Portable computer system 100 is interconnected to an external computer system 902, an external display 904, an external pointing device 906, and an external keyboard 908. External computer system 902 is typically a desktop computer system. External display 904 is typically a monitor that is normally used with computer system 902. Pointing device 906 is typically a mouse, trackball, trackpad, etc. that is normally used with computer system 902. Keyboard 908 is typically normally used with computer system 902.

Display output 910 of external computer system 202 is connected to display input 912 of portable computer system 100. External display 904 is connected to display output 914. Pointing device input 916 of external computer system 902 is connected to pointing device output 918 of portable computer system 900. External pointing device 906 is connected to pointing device input 920 of portable computer system 900. Keyboard input 922 of external computer system 902 is connected to keyboard output 924 of portable computer system 900. External keyboard 908 is connected to keyboard input 926 of portable computer 900.

Portable computer system 900 includes display signal output 928, internal display device 930, pointing device input 932, internal pointing device 934, keyboard input 936 and internal keyboard 938. Portable computer system 900 also includes device switching circuits 940, 942, and 944, which, in this example, are configured in what may be termed the "normal" configuration. In this configuration, each switching circuit is configured so that each computer system's display, pointing device, and keyboard operate with that computer system. For example, display switching circuit 940 is configured so that display output signal 928 is routed to internal display 930 and the display signal from the external computer system 902 is routed to external display 904. Likewise, pointing device switching circuit 942 is configured so that the output signal from internal pointing device 934 is routed to pointing device input 932 and the pointing device signal from the external pointing device 906 is routed to external computer system 902. In addition, keyboard switching circuit 944 is configured so that the output signal from internal keyboard 938 is routed to keyboard input 936 and the keyboard signal from the external keyboard 908 is routed to external computer system 902.

Figure 10:
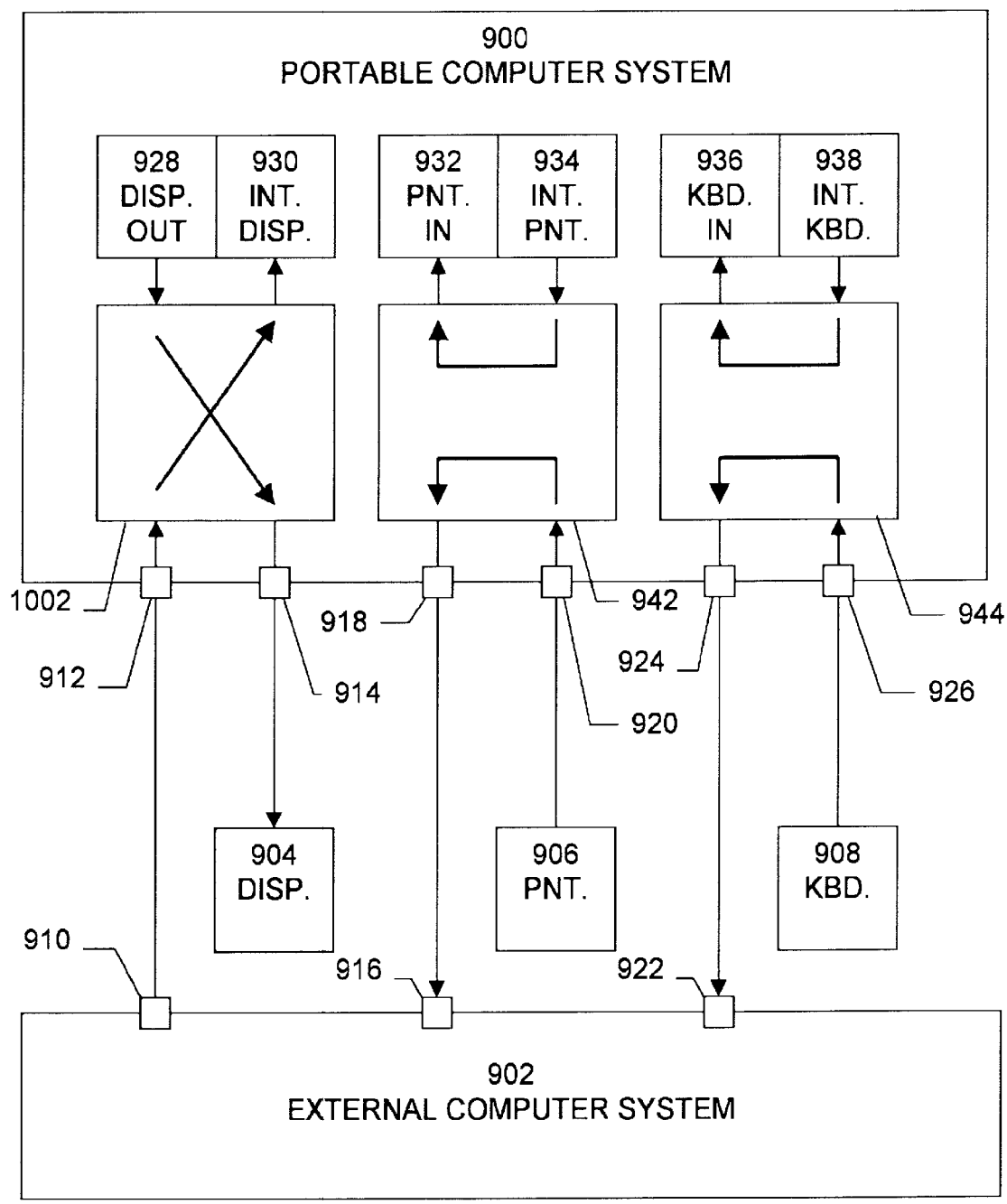
FIG. 10 is an exemplary block diagram of one configuration of a system in which the portable computer system of FIG. 8 may be used.

Another exemplary configuration of the present invention is shown in FIG. 10. In this configuration, devices are connected similarly to the connections shown in FIG. 9. However, display switching circuit 1002 is configured to route display output signal 928 to external display 904 and the display signal from the external computer system 902 is routed to the internal display 930. This configuration allows the user, for example, to use the portable computer system, along with the internal keyboard and pointing device of the portable computer system, and also to use external display 904. Likewise, this configuration allows the user to use the external computer system, along with the external keyboard and external pointing device, and also to use the internal display of the portable computer system. Pointing device switching circuit 942 and keyboard switching circuit 944 may additionally be switched or not depending upon the devices the user wishes to use.

Figure 11:
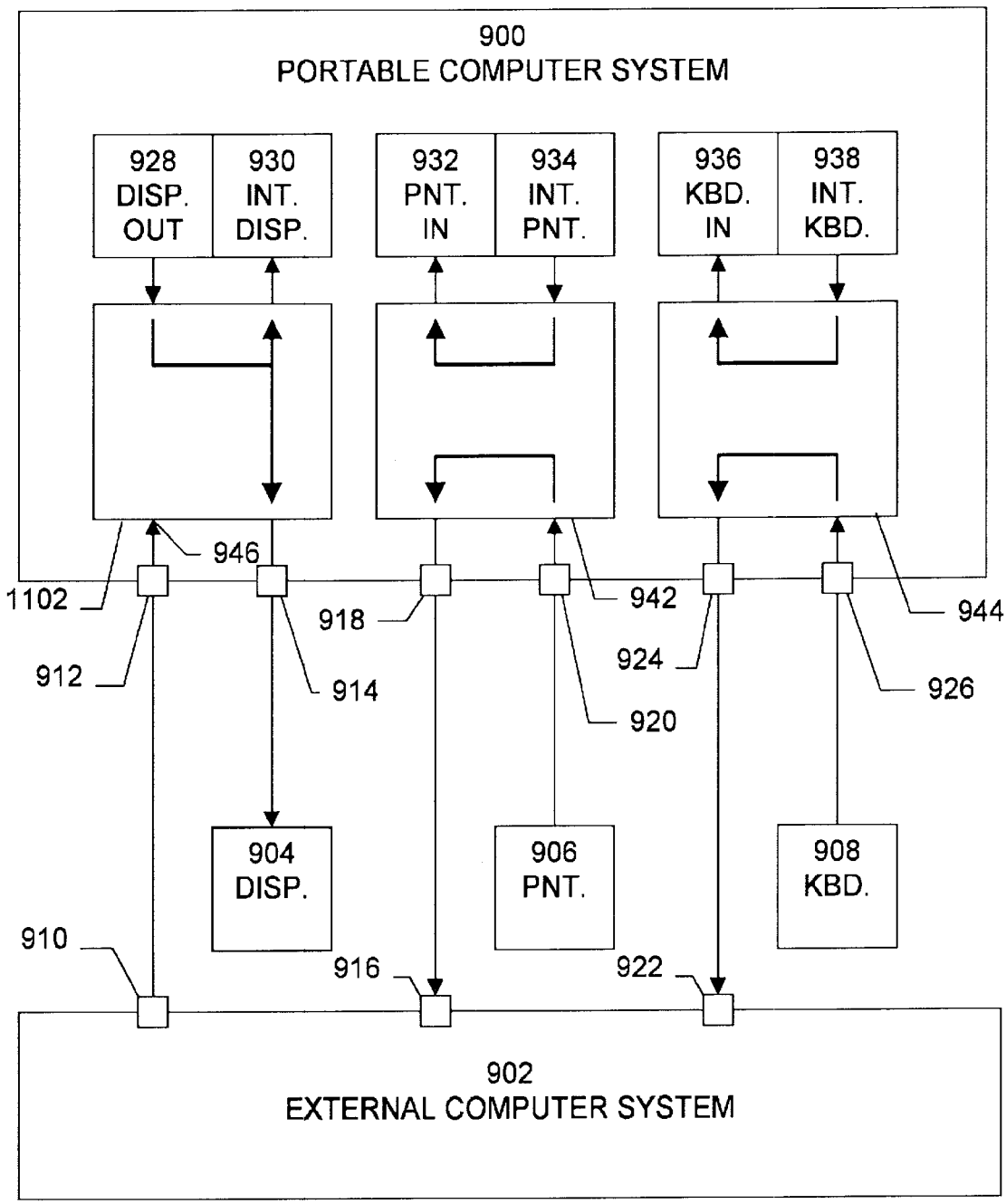
FIG. 11 is an exemplary block diagram of one configuration of a system in which the portable computer system of FIG. 8 may be used.

Another exemplary configuration of the present invention is shown in FIG. 11. In this configuration, devices are connected similarly to the connections shown in FIG. 9. However, display switching circuit 940 is configured to route display output signal 928 to both internal display 930 and external display 904. This allows the display output of the portable computer system to be viewed on both the internal and external display devices. It is to be noted that the external computer system is not connected to any display device. In some situations this is of no importance. However, in some situations, the external display signal input 946 of display switching device 940 must emulate the input of a display device, so that external computer system 902 acts as though it is still connected to a display device. Although not shown, the pointing device switching circuit 942 and the keyboard switching circuit 944 may be configured similarly to display switching device 940. If circuit 942 and 944 are so configured, then it is likely that the inputs to the switching circuits will have to emulate the appropriate devices.

Variations of this configuration are also possible. For example, the external display device may be a video display projector, rather than a monitor. This configuration would be typically be used for presentations. In addition, the configuration may be reversed, so that the display signal from the external computer system is output to both display devices.

Figure 12:
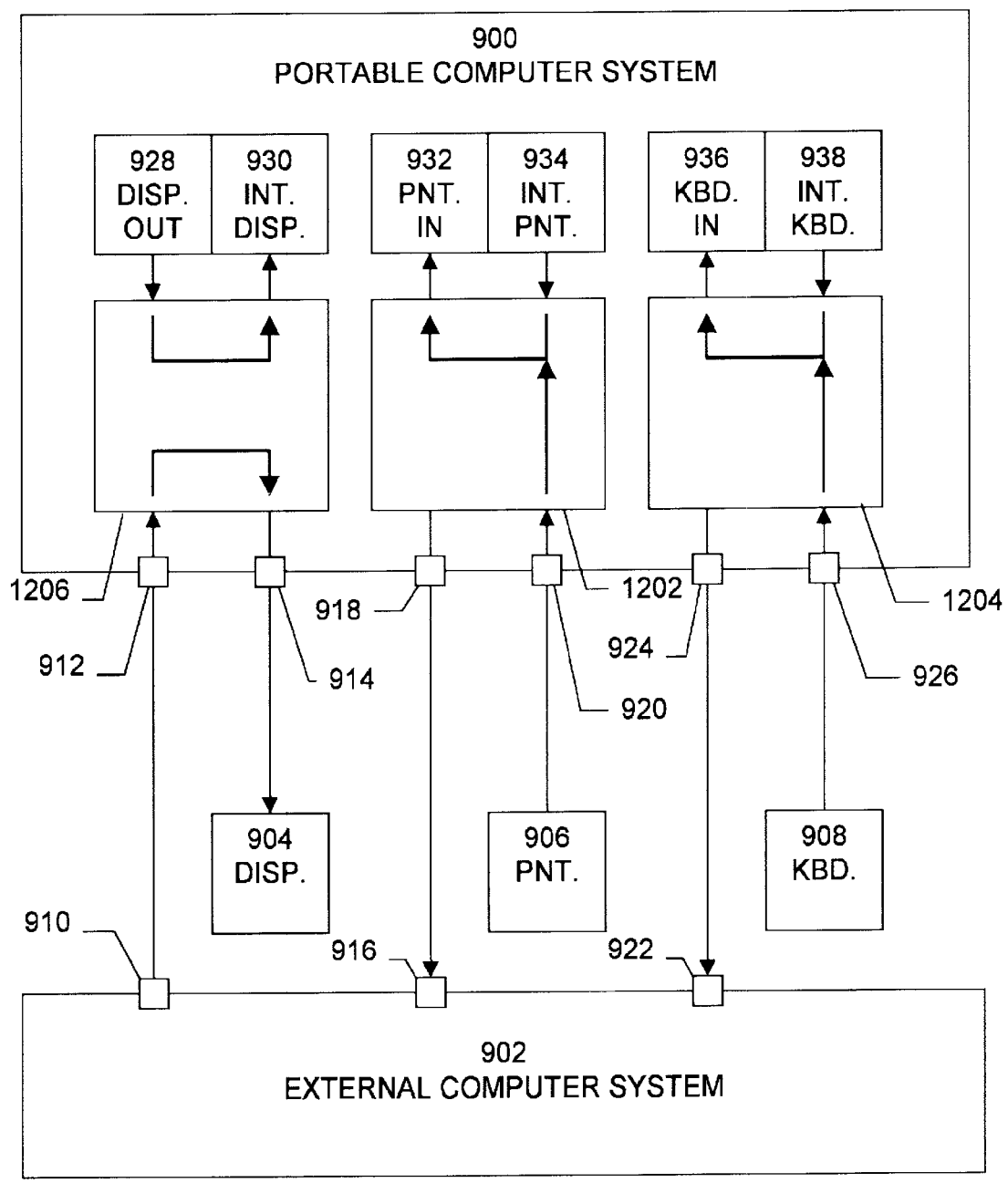
FIG. 12 is an exemplary block diagram of one configuration of a system in which the portable computer system of FIG. 8 may be used.

Another exemplary configuration of the present invention is shown in FIG. 12. In this configuration, devices are connected similarly to the connections shown in FIG. 9. However, pointing device switching circuit 1202 is configured to route signals from both pointing devices to the portable computer system. Likewise, keyboard switching circuit 1204 is configured to route signals from both keyboards to the portable computer system. This configuration allows a user to alternately operate the portable computer system using either pointing device and keyboard as desired, since each keyboard or pointing device will only transmit a signal when it is actually being used. Circuits 1202 and 1204 may similarly be configured to route signals from both pointing devices and both keyboards to the external computer system.

Display switching circuit 1206 is not shown configured to route both display output signals to a single display device, since the display output signal are continuous and would interfere with each other. However, if display switching circuit 1202 were more than a switching device, this configuration would be possible. For example, if the display switching circuit included a video overlay circuit, the signals from both display outputs might be usefully merged onto one display.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer system comprising:
  a display adapter operable to output a display signal;
  an input adapter operable to receive a keyboard signal and a pointing device signal;
  a display device operable to receive a display signal;
  a keyboard operable to output a keyboard signal;
  a pointing device operable to output a pointing device signal;

a display switching circuit connected to the display signal and connectable to an external display signal, operable to select between the display signal and the external display signal and output the selected signal to the display device or to an external display device;

a keyboard switching circuit connected to the keyboard signal and connectable to an external keyboard signal, operable to select between the keyboard signal and the external keyboard signal and output the selected signal to the input adapter or to an external computer system; and a pointing device switching circuit connected to the pointing device signal and connectable to an external pointing device signal, operable to select between the pointing device signal and the pointing device keyboard signal and output the selected signal to the input adapter or to an external computer system.

2. The computer system of claim 1, further comprising a central processing unit, and wherein the display switching circuit, the keyboard switching circuit, and the pointing device switching circuit are controllable by the central processing unit.

3. A switching apparatus in a computer system comprising a display adapter operable to output a display signal, an input adapter operable to receive a keyboard signal and a pointing device signal, a display device operable to receive a display signal, a keyboard operable to output a keyboard signal, and a pointing device operable to output a pointing device signal, the switching apparatus comprising:

a display switching circuit connected to the display signal and connectable to an external display signal, operable to select between the display signal and the external display signal and output the selected signal to the display device or to an external display device;

a keyboard switching circuit connected to the keyboard signal and connectable to an external keyboard signal, operable to select between the keyboard signal and the external keyboard signal and output the selected signal to the input adapter or to an external computer system; and a pointing device switching circuit connected to the pointing device signal and connectable to an external pointing device signal, operable to select between the pointing device signal and the pointing device keyboard signal and output the selected signal to the input adapter or to an external computer system.

4. The switching apparatus of claim 3, wherein the computer system further comprises a central processing unit, and the display switching circuit, the keyboard switching circuit, and the pointing device switching circuit are controllable by the central processing unit.

5. A computer program product for controlling a switching apparatus in a computer system comprising a display adapter operable to output a display signal, an input adapter operable to receive a keyboard signal and a pointing device signal, a display device operable to receive a display signal, a keyboard operable to output a keyboard signal, and a pointing device operable to output a pointing device signal, the switching apparatus comprising a display switching circuit connected to the display signal and connectable to an external display signal, a keyboard switching circuit connected to the keyboard signal and connectable to an external keyboard signal, and a pointing device switching circuit connected to the pointing device signal and connectable to an external pointing device signal, the computer program product comprising:

a computer readable medium;

computer program instructions, recorded on the computer readable medium, executable by a processor, for:

operating the display switching circuit to select between the display signal and the external display signal and output the selected signal to the display device or to an external display device;

operating the keyboard switching circuit to select between the keyboard signal and the external keyboard signal and output the selected signal to the input adapter or to an external computer system; and operating the pointing device switching circuit to select between the pointing device signal and the pointing device keyboard signal and output the selected signal to the input adapter or to an external computer system.

6. A computer system comprising:

a central processing unit;

a display device operable to receive a display signal;

a keyboard operable to output a keyboard signal;

a pointing device operable to output a pointing device signal;

a display circuit connected to the display device and connectable to an external display device, operable to receive an external display signal, operable to generate a display signal to drive the display device and to generate a display signal to drive the external display device, operable to selectively output the generated display signal to the display device, the external display device or both the display device and the external display device, and operable to selectively output the external display signal to the display device, the external display device or both the display device and the external display device;

a keyboard circuit connected to the keyboard and connectable to an external keyboard, operable to receive an external keyboard signal, operable to selectively output the keyboard signal to the central processing unit, an external computer system, or both the central processing unit and an external computer system, and operable to selectively output the external keyboard signal to the central processing unit, an external computer system, or both the central processing unit and an external computer system; and a pointing device circuit connected to the pointing device and connectable to an external pointing device, operable to receive an external pointing device signal, operable to selectively output the pointing device signal to the central processing unit, an external computer system, or both the central processing unit and an external computer system, and operable to selectively output the external pointing device signal to the central processing unit, an external computer system, or both the central processing unit and an external computer system.

7. The computer system of claim 6, wherein the display circuit, the keyboard circuit, and the pointing device circuit are controllable by the central processing unit.

8. The computer system of claim 7, further comprising a memory operable to store information relating to a configuration, a setting or a current state of the display circuit, the keyboard circuit, or the pointing device circuit, and operable to store information relating to the internal display, the external display, the internal pointing device, external pointing device, the internal keyboard, or the external keyboard.

9. The computer system of claim 6, wherein the display circuit is configured so as to output the generated display signal to the display device and the external display signal to the external display device, the keyboard circuit is configured to output the keyboard signal to the central processing unit and the external keyboard signal to the external computer system, and the pointing device circuit is configured to output the pointing device signal to the central processing unit and the external pointing device signal to the external computer system.

10. The computer system of claim 6, wherein at least one of the following configurations is selected:
   the display circuit is configured so as to output the generated display signal to the external display device and the external display signal to the display device;
   the keyboard circuit is configured to output the keyboard signal to the external computer system and the external keyboard signal to the central processing unit; and
   the pointing device circuit is configured to output the pointing device signal to the external computer system and the external pointing device signal to the central processing unit.

11. The computer system of claim 6, wherein at least one of the following configurations is selected:
   the display circuit is configured so as to output the generated display signal to the external display device and to the display device;
   the keyboard circuit is configured to output the keyboard signal to the external computer system and to the central processing unit; and
   the pointing device circuit is configured to output the pointing device signal to the external computer system and to the central processing unit.

12. The computer system of claim 6, wherein at least one of the following configurations is selected:
   the display circuit is configured so as to output the external display signal to the external display device and to the display device;
   the keyboard circuit is configured to output the external keyboard signal to the external computer system and to the central processing unit; and
   the pointing device circuit is configured to output the external pointing device signal to the external computer system and to the central processing unit.

13. The computer system of claim 6, wherein at least one of the following configurations is selected:
   the display circuit is configured so as to output the external display signal and the generated display signal to the display device;
   the keyboard circuit is configured to output the external keyboard signal and the keyboard signal to the central processing unit; and
   the pointing device circuit is configured to output the external pointing device signal and the pointing device signal to the central processing unit.

14. The computer system of claim 6, wherein at least one of the following configurations is selected:
   the display circuit is configured so as to output the external display signal and the generated display signal to the external display device;
   the keyboard circuit is configured to output the external keyboard signal and the keyboard signal to the external computer system; and
   the pointing device circuit is configured to output the external pointing device signal and the pointing device signal to the external computer system.

15. A circuit in a computer system comprising a central processing unit, a display device operable to receive a display signal, a keyboard operable to output a keyboard signal, and a pointing device operable to output a pointing device signal, the circuit comprising:
   a display circuit connected to the display device and connectable to an external display device, operable to receive an external display signal, operable to generate a display signal to drive the display device and to generate a display signal to drive the external display device, operable to selectively output the generated display signal to the display device, the external display device or both the display device and the external display device, and operable to selectively output the external display signal to the display device, the external display device or both the display device and the external display device;
   a keyboard circuit connected to the keyboard and connectable to an external keyboard, operable to receive an external keyboard signal, operable to selectively output the keyboard signal to the central processing unit, an external computer system, or both the central processing unit and an external computer system, and operable to selectively output the external keyboard signal to the central processing unit, an external computer system, or both the central processing unit and an external computer system; and
   a pointing device circuit connected to the pointing device and connectable to an external pointing device, operable to receive an external pointing device signal, operable to selectively output the pointing device signal to the central processing unit, an external computer system, or both the central processing unit and an external computer system, and operable to selectively output the external pointing device signal to the central processing unit an external computer system, or both the central processing unit and an external computer system.

16. The circuit of claim 15, wherein the display circuit, the keyboard circuit, and the pointing device circuit are controllable by the central processing unit.

17. The circuit of claim 16, wherein the circuit further comprises a memory operable to store information relating to a configuration, a setting, or a current state of the display circuit, the keyboard circuit, or the pointing device circuit, and operable to store information relating to the internal display, the external display, the internal pointing device, external pointing device, the internal keyboard, or the external keyboard.

18. The circuit of claim 15, wherein the display circuit is configured so as to output the generated display signal to the display device and the external display signal to the external display device, the keyboard circuit is configured to output the keyboard signal to the central processing unit and the external keyboard signal to the external computer system, and the pointing device circuit is configured to output the pointing device signal to the central processing unit and the external pointing device signal to the external computer system.

19. The circuit of claim 15, wherein at least one of the following configurations is selected:
   the display circuit is configured so as to output the generated display signal to the external display device and the external display signal to the display device;
   the keyboard circuit is configured to output the keyboard signal to the external computer system and the external keyboard signal to the central processing unit; and the pointing device circuit is configured to output the pointing device signal to the external computer system and the external pointing device signal to the central processing unit.

20. The circuit of claim 15, wherein at least one of the following configurations is selected:
the display circuit is configured so as to output the generated display signal to the external display device and to the display device;
the keyboard circuit is configured to output the keyboard signal to the external computer system and to the central processing unit; and
the pointing device circuit is configured to output the pointing device signal to the external computer system and to the central processing unit.

21. The circuit of claim 15, wherein at least one of the following configurations is selected:
the display circuit is configured so as to output the external display signal to the external display device and to the display device;
the keyboard circuit is configured to output the external keyboard signal to the external computer system and to the central processing unit; and
the pointing device circuit is configured to output the external pointing device signal to the external computer system and to the central processing unit.

22. The circuit of claim 15, wherein at least one of the following configurations is selected:
the display circuit is configured so as to output the external display signal and the generated display signal to the display device;
the keyboard circuit is configured to output the external keyboard signal and the keyboard signal to the central processing unit; and
the pointing device circuit is configured to output the external pointing device signal and the pointing device signal to the central processing unit.

23. The circuit of claim 15, wherein at least one of the following configurations is selected:
the display circuit is configured so as to output the external display signal and the generated display signal to the external display device;
the keyboard circuit is configured to output the external keyboard signal and the keyboard signal to the external computer system; and
the pointing device circuit is configured to output the external pointing device signal and the pointing device signal to the external computer system.

24. A computer program product for controlling a circuit in a computer system comprising a central processing unit, a display device operable to receive a display signal, a keyboard operable to output a keyboard signal, and a pointing device operable to output a pointing device signal, the circuit comprising a display circuit connected to the display device and connectable to an external display device, a keyboard circuit connected to the keyboard and connectable to an external keyboard, and a pointing device circuit connected to the pointing device and connectable to an external pointing device, the computer program product comprising:
a computer readable medium;
computer program instructions, recorded on the computer readable medium, executable by a processor, for:
operating the display circuit to receive an external display signal, operating the display circuit to generate a display signal to drive the display device and to generate a display signal to drive the external display device, operating the display circuit to selectively output the generated display signal to the display device, the external display device or both the display device and the external display device, and operating the display circuit to selectively output the external display signal to the display device, the external display device or both the display device and the external display device;
operating the keyboard circuit to receive an external keyboard signal, operating the keyboard circuit to selectively output the keyboard signal to the central processing unit, an external computer system, or both the central processing unit and an external computer system, and operating the keyboard circuit to selectively output the external keyboard signal to the central processing unit, an external computer system, or both the central processing unit and an external computer system; and
operating the pointing device circuit to receive an external pointing device signal, operating the pointing device circuit to selectively output the pointing device signal to the central processing unit, an external computer system, or both the central processing unit and an external computer system, and operating the pointing device circuit to selectively output the external pointing device signal to the central processing unit, an external computer system, or both the central processing unit and an external computer system.

25. The computer program product of claim 24, wherein the circuit further comprises a memory and the computer program product further comprises computer program instructions for performing the steps of:
storing in the memory information relating to a configuration, a setting, or a current state of the display circuit, the keyboard circuit, or the pointing device circuit, and operable to store information relating to the internal display, the external display, the internal pointing device, external pointing device, the internal keyboard, or the external keyboard.

26. The computer program product of claim 24, wherein the computer program product further comprises computer program instructions for performing the steps of:
configuring the display circuit to output the generated display signal to the display device and the external display signal to the external display device;
configuring the keyboard circuit to output the keyboard signal to the central processing unit and the external keyboard signal to the external computer system; and
configuring the pointing device circuit to output the pointing device signal to the central processing unit and the external pointing device signal to the external computer system.

27. The computer program product of claim 24, wherein the computer program product further comprises computer program instructions for performing the step of:
selecting at least one of the following configurations:
the display circuit is configured so as to output the generated display signal to the external display device and the external display signal to the display device;
the keyboard circuit is configured to output the keyboard signal to the external computer system and the external keyboard signal to the central processing unit; and the pointing device circuit is configured to output the pointing device signal to the external computer system and the external pointing device signal to the central processing unit.

28. The computer program product of claim 24, wherein the computer program product further comprises computer program instructions for performing the step of:

selecting at least one of the following configurations:
the display circuit is configured so as to output the generated display signal to the external display device and to the display device;
the keyboard circuit is configured to output the keyboard signal to the external computer system and to the central processing unit; and
the pointing device circuit is configured to output the pointing device signal to the external computer system and to the central processing unit.

29. The computer program product of claim 24, wherein the computer program product further comprises computer program instructions for performing the step of:

selecting at least one of the following configurations:
the display circuit is configured so as to output the external display signal to the external display device and to the display device;
the keyboard circuit is configured to output the external keyboard signal to the external computer system and to the central processing unit; and
the pointing device circuit is configured to output the external pointing device signal to the external computer system and to the central processing unit.

30. The computer program product of claim 24, wherein the computer program product further comprises computer program instructions for performing the step of:

selecting at least one of the following configurations:
the display circuit is configured so as to output the external display signal and the generated display signal to the display device;
the keyboard circuit is configured to output the external keyboard signal and the keyboard signal to the central processing unit; and
the pointing device circuit is configured to output the external pointing device signal and the pointing device signal to the central processing unit.

31. The computer program product of claim 24, wherein the computer program product further comprises computer program instructions for performing the step of:

selecting at least one of the following configurations:
the display circuit is configured so as to output the external display signal and the generated display signal to the external display device;
the keyboard circuit is configured to output the external keyboard signal and the keyboard signal to the external computer system; and
the pointing device circuit is configured to output the external pointing device signal and the pointing device signal to the external computer system.

* * * * *